(12) United States Patent
DuPlessis et al.

(10) Patent No.: US 9,404,690 B2
(45) Date of Patent: Aug. 2, 2016

(54) CONDENSER COIL HOLDER FOR WATER HEATER

(75) Inventors: Samuel DuPlessis, Louisville, KY (US); Eliel Rodriguez, Louisville, KY (US)

(73) Assignee: Haier US Applicance Solutions, Inc., Wilmington, DE (US)

( * ) Notice: Subject to any disclaimer, the term of this patent is extended or adjusted under 35 U.S.C. 154(b) by 861 days.

(21) Appl. No.: 13/197,513

(22) Filed: Aug. 3, 2011

(65) Prior Publication Data

US 2013/0031923 A1    Feb. 7, 2013

(51) Int. Cl.
| | |
|---|---|
| F25B 27/00 | (2006.01) |
| F28D 1/06 | (2006.01) |
| F28D 7/02 | (2006.01) |
| F28D 20/00 | (2006.01) |
| F24H 4/04 | (2006.01) |
| F24H 9/20 | (2006.01) |
| F28F 9/013 | (2006.01) |
| F28D 21/00 | (2006.01) |
| F24H 1/20 | (2006.01) |

(52) U.S. Cl.
CPC .. F28D 1/06 (2013.01); F24H 4/04 (2013.01); F24H 9/2021 (2013.01); F28D 7/024 (2013.01); F28D 20/0034 (2013.01); F24D 2200/12 (2013.01); F24H 1/202 (2013.01); F24H 2250/02 (2013.01); F28D 2020/0069 (2013.01); F28D 2020/0078 (2013.01); F28D 2021/007 (2013.01); F28F 9/013 (2013.01); Y02E 60/142 (2013.01)

(58) Field of Classification Search
CPC .......... F24H 4/02; F24H 1/181; F24H 1/182; F34H 1/183
USPC .......................................... 122/19.2; 237/2 B
See application file for complete search history.

(56) References Cited

U.S. PATENT DOCUMENTS

| | | | | |
|---|---|---|---|---|
| 1,942,741 | A | * | 1/1934 | Austin ............................. 62/395 |
| 3,902,332 | A | * | 9/1975 | Torcomian ...................... 62/451 |
| 4,452,226 | A | | 6/1984 | Daugirda |
| 4,765,360 | A | * | 8/1988 | Baird ............................ 137/312 |
| 4,860,728 | A | * | 8/1989 | Nelson ......................... 122/19.2 |
| 5,134,683 | A | * | 7/1992 | Powell .......................... 392/449 |
| 5,178,351 | A | * | 1/1993 | Lesage .......................... 248/146 |
| 5,180,077 | A | * | 1/1993 | Lewis ......................... 220/592.2 |
| 5,645,103 | A | * | 7/1997 | Whittaker ..................... 137/312 |
| 5,836,554 | A | * | 11/1998 | Lesage .......................... 248/152 |
| 5,906,109 | A | * | 5/1999 | Dieckmann et al. .......... 62/238.6 |

(Continued)

FOREIGN PATENT DOCUMENTS

| | | | | |
|---|---|---|---|---|
| GB | 2343506 A | * | 5/2000 | ............. F24D 3/142 |
| JP | 2000291247 A | * | 10/2000 | |

OTHER PUBLICATIONS

Machine Translation of JP 2000-291247A Google Patents.*

Primary Examiner — Avinash Savani
Assistant Examiner — Deepak Deean
(74) Attorney, Agent, or Firm — Dority & Manning, P A

(57) ABSTRACT

A condenser coil holder apparatus comprises a first portion formed to have a shape that is at least substantially complementary to a shape of a bottom surface of a water storage tank of a water heater so as to hold a condenser coil against the bottom surface of the water storage tank of the water heater when assembled. The condenser coil holder apparatus also comprises a second portion formed as a base for the first portion.

15 Claims, 5 Drawing Sheets

(56) References Cited

U.S. PATENT DOCUMENTS

| | | | |
|---|---|---|---|
| 5,924,392 A | 7/1999 | Hall | |
| 6,135,410 A * | 10/2000 | Harrison | 248/346.01 |
| 6,221,456 B1 * | 4/2001 | Pogorski et al. | 428/69 |
| 6,267,261 B1 * | 7/2001 | Lesage | 220/567.3 |
| D452,903 S * | 1/2002 | Whitsitt | D23/322 |
| 6,588,378 B1 * | 7/2003 | Henderson et al. | 122/19.2 |
| 6,637,453 B2 * | 10/2003 | Robinson | 137/312 |
| 8,100,140 B1 * | 1/2012 | Cantolino | 137/312 |
| 8,342,139 B2 * | 1/2013 | Rockwell | 122/19.2 |
| 2006/0011149 A1 * | 1/2006 | Stevens | 122/19.2 |
| 2010/0209084 A1 * | 8/2010 | Nelson et al. | 392/465 |
| 2011/0252820 A1 * | 10/2011 | Hockman et al. | 62/238.7 |

* cited by examiner

CONDENSER COIL HOLDER FOR WATER HEATER

BACKGROUND OF THE INVENTION

The subject matter disclosed herein relates to water heaters, and more particularly to apparatus and techniques for improving heat transfer between a condenser coil and a water storage tank of a heat pump water heater.

Condenser coils used in heat pump water heaters are made of metal tubing that must be bent into the intended shape. The process of bending the metal tubing typically results in a "spring back" from the intended shape, i.e., at least part of the metal tubing reverts back to its original shape or somewhere between its original shape and the intended shape. Thus, the accuracy of the condenser coil shape, as well as that of the coil size, may have great variation from the intended specifications.

In addition, the condenser coil is typically very flexible and may not be held tightly to the tank when installed on the tank. Water storage tank bottoms are generally not flat and thus, when the condenser coil is routed to the bottom of the tank, holding the condenser coil tightly to the bottom is difficult. The separation between the condenser coil and the bottom of the tank results in heat transfer inefficiencies, thus requiring greater energy use to heat the water in the storage tank to a desired temperature level.

BRIEF DESCRIPTION OF THE INVENTION

As described herein, the exemplary embodiments of the present invention overcome one or more disadvantages known in the art.

One aspect of the present invention relates to a condenser coil holder apparatus comprising a first portion formed to have a shape that is at least substantially complementary to a shape of a bottom surface of a water storage tank of a water heater so as to hold a condenser coil against the bottom surface of the water storage tank of the water heater when assembled. The condenser coil holder apparatus also comprises a second portion formed as a base for the first portion.

Another aspect of the present invention relates to a water heater assembly comprising a water storage tank, a condenser coil routed under the water storage tank, and a condenser coil holder formed to have a shape that is at least substantially complementary to a shape of a bottom surface of the water storage tank so as to hold the condenser coil against the bottom surface of the water storage tank.

Advantageously, illustrative principles of the present invention provide for elimination or reduction in the separation between the condenser coil and the bottom of the water storage tank, thereby improving heat transfer efficiency and thus requiring less energy use to heat the water in the tank to a desired temperature level.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and, unless otherwise indicated, they are merely intended to conceptually illustrate the structures and procedures described herein.

DETAILED DESCRIPTION OF THE EXEMPLARY EMBODIMENTS OF THE INVENTION

One or more of the embodiments of the invention will be described below in the context of one or more illustrative heat pump water heater systems. However, it is to be understood that principles of the invention are not necessarily intended to be limited to use in the specific water heater designs illustrated herein. Rather, principles of the invention may be applied to and deployed in any other suitable environment in which it would be desirable to improve heat transfer between a condenser coil and a water storage tank.

As will be described herein in illustrative detail, principles of the invention provide a condenser coil holder that is cooperatively mounted with the water storage tank of a heat pump water heater system to hold the condenser coil tightly to the tank. In illustrative embodiments, the condenser coil holder holds the coil tightly against the outer bottom of the water storage tank. The condenser coil holder may also function in centering the water storage tank in the overall water heater assembly. In illustrative embodiments, the condenser coil holder can be made of an insulating material such as plastic or foam that acts as a thermal barrier between the metal storage tank and the metal bottom cover of the overall water heater assembly. These features make the water heater more energy efficient.

Still further, use of the condenser coil holder in the overall assembly method of the water heater assembly allows the easy routing of the condenser coil between the underside of the tank and the outside of the tank by molding in the condenser coil holder, a path for the tubing to follow.

Figure 1:
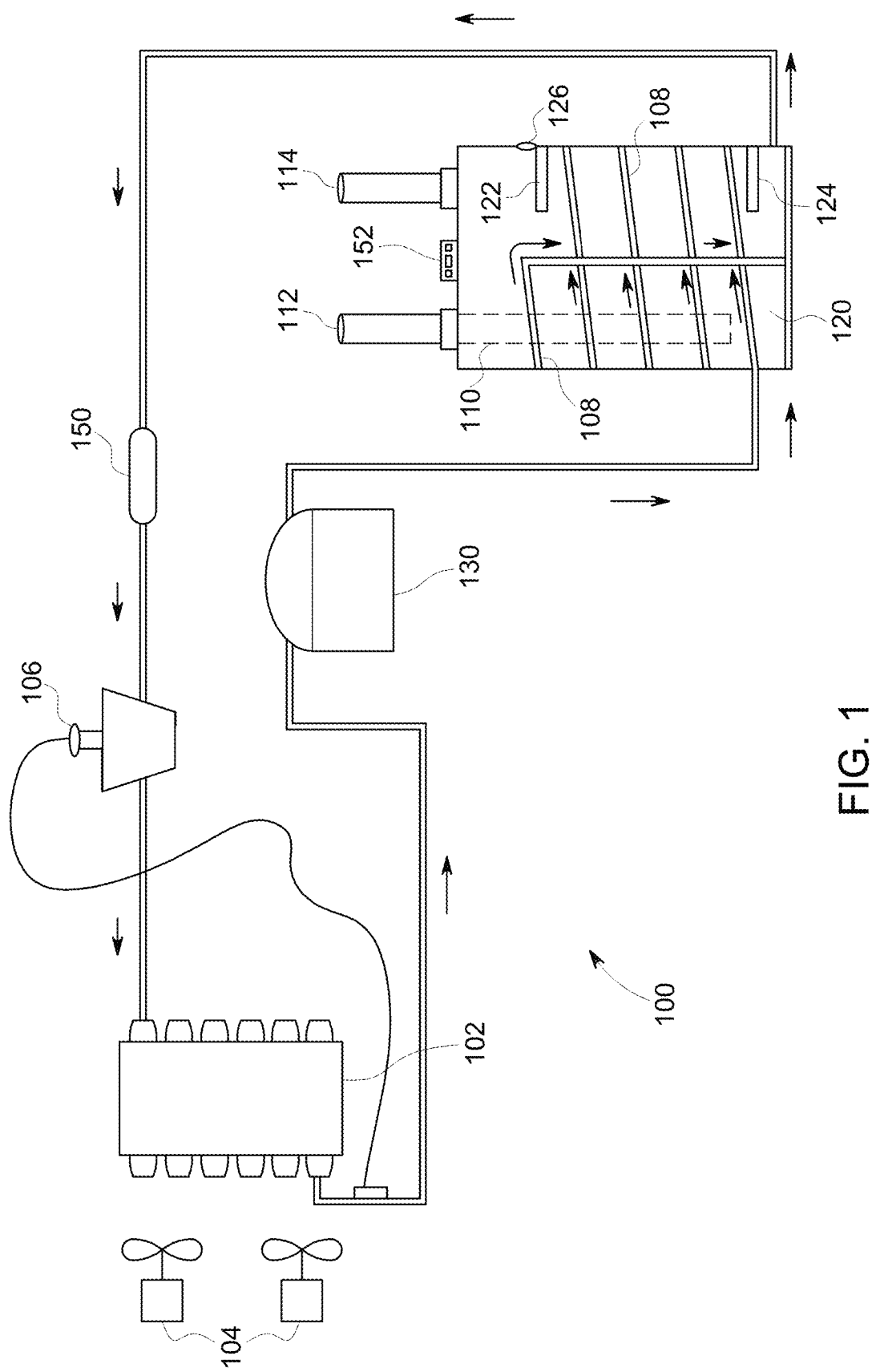
FIG. 1 is a diagram of a heat pump water heater system, in accordance with an embodiment of the invention.

Referring initially to FIG. 1, a heat pump water heater system 100 is illustrated with which one or more embodiments of a condenser coil holder formed in accordance with the invention can be implemented.

As shown, the heat pump water heater system 100 comprises an evaporator 102, one or more fans 104, a throttling device 106, a condenser (coil) 108, a compressor 130, and a filter 150. Condenser 108, which comprises a coil wrapped around the side and the bottom of a water storage tank 120 (as will be shown later in FIG. 2), is assembled in a heat exchange relationship with the water in the water storage tank 120.

During operation of the heat pump cycle, a refrigerant exits the evaporator 102 as a fluid in the form of a saturated vapor and/or high quality vapor mixture. Note that the small directional arrows in FIG. 1 illustrate the direction of refrigerant flow through the system 100. Upon exiting the evaporator 102, the refrigerant enters the compressor 130 where the pressure and temperature increase. The temperature and pressure are increased in the compressor 130 such that the refrigerant becomes a superheated vapor. The superheated vapor from the compressor 130 enters the condenser 108.

While in the condenser 108, the superheated vapor transfers energy to the water within the water storage tank 120. Upon transferring energy to the water within the water storage tank 120, the refrigerant turns into a saturated liquid and/or high quality liquid vapor mixture. This high quality/saturated liquid vapor mixture exits the condenser 108 and travels through the filter 150 to the throttling device 106. The throttling device comprises an expansion valve. Upon exiting the throttling device 106, the pressure and temperature of the refrigerant drop at which time the refrigerant enters evaporator 102, where it absorbs heat from the surrounding air passing over the evaporator, causing the low-pressure refrigerant to vaporize. The refrigerant exits the evaporator and the cycle repeats itself.

The heat pump water heater 100 also includes a water inlet line 112 for allowing cold water to enter the heat pump water heater 100, where it is directed to the bottom of the tank 120 via a dip tube 110. The heat pump water heater 100 also has electric heating elements 122 and 124 placed near the top and bottom of the water storage tank 120 to assist the condenser coil 108 in heating the water. The embodiment in FIG. 1 depicts the heating elements projecting into the interior of the tank, however, other configurations providing for positioning the upper and lower elements to heat the water in the upper and lower regions of the tank respectively could be similarly employed. Of course, more or less such electric heating elements could be used in the system 100.

The heated water exits the heat pump water heater 100 near the top of tank 120 at water outlet line 114 and flows to the residence or other place where heated water is desired. The heat pump water heater 100 also has a temperature sensor 126 positioned to sense the temperature of the water in the upper region of the tank and may also have additional temperature sensors placed at various locations for sensing other temperatures, such as the heat pump condenser inlet and outlet temperatures, ambient temperature, etc. In the embodiment illustrated in FIG. 1, the water temperature sensor 126 is positioned toward the upper end of the tank 120.

The system also includes a controller 152, equipped with a microprocessor programmed to include a water temperature and flow module, which is operatively connected to the heat pump water heater and configured to receive data representative of temperature readings measured by the sensor 126. The temperature readings received by the controller 152 are processed by the water temperature and flow module to determine the temperature of the water in the tank 120. The water temperature and flow module within the controller 152 is further configured to process data representative of temperature readings measured by the sensor 126 to determine the rate at which the temperature of water in the water storage tank 120 changes. In response to the sensed water temperature and the rate at which the temperature of water in the water storage tank 120 changes, the controller 152 determines which one or more of the compressor 130, the upper electric resistance heater 122, and the lower electric resistance heater 124 shall be energized/engaged, and for how long, in order to heat the water within the water storage tank 120.

The controller 152 and the water temperature and flow module therein, along with the sensor 126, are operatively configured to effectively respond to small amounts of water being withdrawn from the water storage tank which causes small temperature changes. This rate of temperature change information could also be used in lieu of a flow meter to detect the approximate flow rate of water being withdrawn from the tank, for example, by comparing the detected rate of change of temperature with a look up table comprising a set of empirically determined temperature change rate/flow rate correlations and choosing the flow rate associated from the table that is closest to the detected temperature rate of change. The system may also be programmed to determine how much water is used in a short period of time in order to use that information to determine the most efficient manner to heat the unheated water added to the water storage tank 120.

Figure 2:
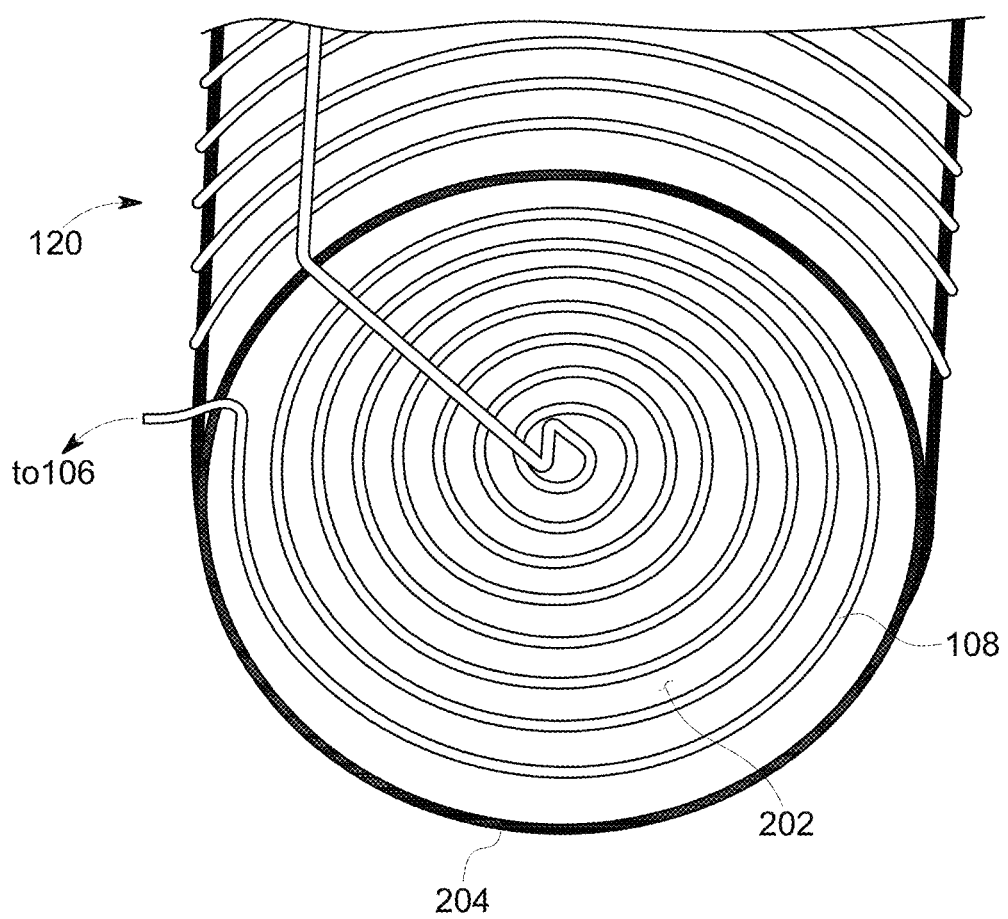
FIG. 2 is a diagram of the outer bottom of a water storage tank with a condenser coil installed, in accordance with an embodiment of the invention.

Referring now to FIG. 2, the outer bottom of water storage tank 120 is shown with the condenser coil 108 installed. As explained above, the condenser coil wraps around the outer side of the water storage tank 120 and then extends down under the tank to the outer bottom of the tank, denoted as 202 in FIG. 2. On the bottom 202 of the tank, the condenser coil extends to the center of the tank bottom and then spirals outward to the outer perimeter 204 of the tank bottom. The condenser coil 108 then returns to the throttling device 106 (via filter 150), as shown in FIG. 1.

It is important to note that in the water storage tank embodiment illustrated in FIG. 2, the tank bottom 202 is concave in shape. Of course, the tank bottom can take on any number of other shapes. As mentioned above, the condenser coil 108 is typically very flexible and may not be held tightly to the tank bottom when bent and then installed on the tank. The separation between the condenser coil and the bottom of the tank results in heat transfer inefficiencies, thus requiring greater energy use to heat the water in the storage tank to a desired temperature level.

In accordance with principles of the invention, a condenser coil holder is formed in a shape that is complementary (or at least substantially complementary) to that of the outer bottom of the water heater tank. For example, where the outer bottom 202 of the water heater tank 120 in FIG. 2 is concave in shape, the shape of the condenser coil holder is convex in shape.

It is to be understood that the shape of the condenser coil holder does not have to be formed to be an exact complement to the tank bottom, rather it can be at least substantially complementary, so long as when the holder is installed, it serves to apply force against the condenser coil so that the coil is held more tightly against the tank bottom than it would be if no holder mechanism were present.

That is, when assembled, the weight of the water heater pressing into the condenser coil holder forces the condenser coil tightly to the bottom of the tank. This ensures contact with the water heater tank bottom, and improves energy transfer from the coil to the water in the tank. To promote even more efficient heat transfer, thermal grease can be applied between the condenser coil and the tank.

Also, the condenser coil holder is preferably molded such that its diameter dimension is similar to the diameter dimension of the bottom of the water heater assembly. This tight fit helps to position the holder in the center of the bottom of the water storage tank.

In one illustrative embodiment, the condenser coil holder is made of insulating rigid foam such as, for example, expanded polystyrene. The condenser coil holder can also have a path for the tubing molded into it. This rigid foam structure is preferably dense enough to hold the water heater assembly together prior to sealing the entire assembly. This insulating rigid foam-based embodiment of a condenser coil holder is described below in detail in the context of FIGS. 3-5.

Figure 3:
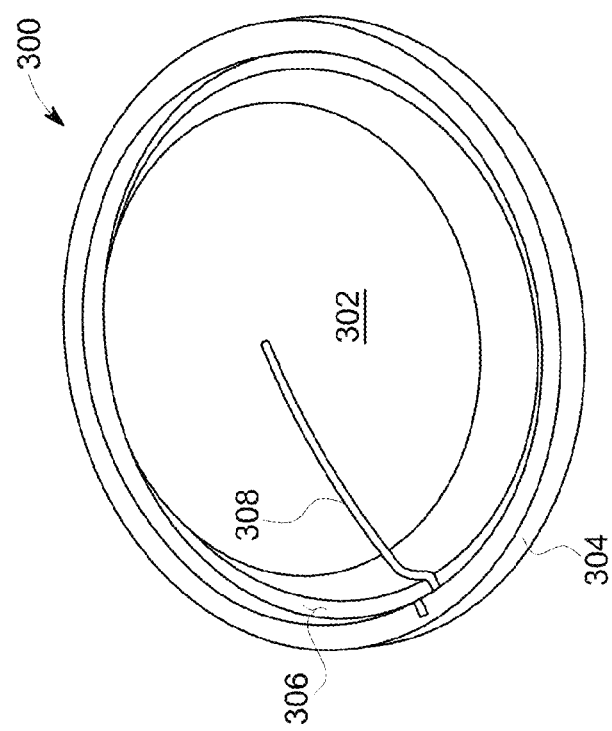
FIG. 3 is a diagram of a condenser coil holder, in accordance with an embodiment of the invention.

FIG. 3 is a diagram of a condenser coil holder, in accordance with an embodiment of the invention. It is to be understood that condenser coil holder 300, as shown in FIG. 3, can be formed as a single part via expanded polystyrene being injected into a mold that conforms to the desired dimensions of the condenser coil holder. Alternatively, individual subparts of the condenser coil holder can be separately molded and then assembled to form the condenser coil holder. Those of ordinary skill in the art will readily appreciate how such a part and/or subparts can be formed.

The condenser coil holder 300 includes a convex center portion 302. Recall as explained above, the condenser coil holder is formed to have a shape that is complementary (or at least substantially complementary) to the shape of the bottom of the water storage tank. Thus, since in this embodiment it is assumed that the shape of the tank bottom is concave, the shape of the center portion 302 of the holder is generally convex. Of course, the shape of the center portion can be other than convex so long as it serves to hold the condenser coil against the tank bottom.

The condenser coil holder 300 also includes, as shown in FIG. 3, a base portion 304 formed around the outer perimeter of the center portion 302, and a channel portion 306 formed between the base portion 304 and the center portion 302. The shape and dimensions of the base portion 304 and the channel portion 306 are dependent on the shape and dimensions of the water storage tank that will be reside on top of the condenser coil holder 300. Thus, since it is assumed that the condenser coil holder 300 in FIG. 3 is formed to accommodate the shape of the water storage tank 120, whose bottom portion is shown in FIG. 2, it is evident that the channel portion 306 is circularly formed to accommodate the circular outer perimeter 204 of the bottom of the water storage tank 120. Likewise, the base portion 304 of the condenser coil holder 300 is circularly formed to fit around the outside of the circular outer perimeter 204 of the bottom of the water storage tank 120.

The condenser coil holder 300 also includes a coil groove portion 308. The groove portion 308 extends outward from about the center of the top of the convex center portion 302, traversing the channel portion 306, and ending at least partially through the base portion 304. With joint reference to FIGS. 2 and 3, it can be seen that the part of the condenser coil 108 that comes from the side of the water storage tank 120 and goes under the tank to the bottom surface 202 of the tank (FIG. 2) is accommodated by the groove portion 308 formed in the condenser coil holder 300 (FIG. 3). While only one coil groove portion is shown as being formed in the holder 300, it is to be appreciated that one or more other grooves could be formed in the center portion 302 to accommodate the spiraling circle formed by the shape of the coil as it covers the bottom surface of the water tank.

Figure 4:
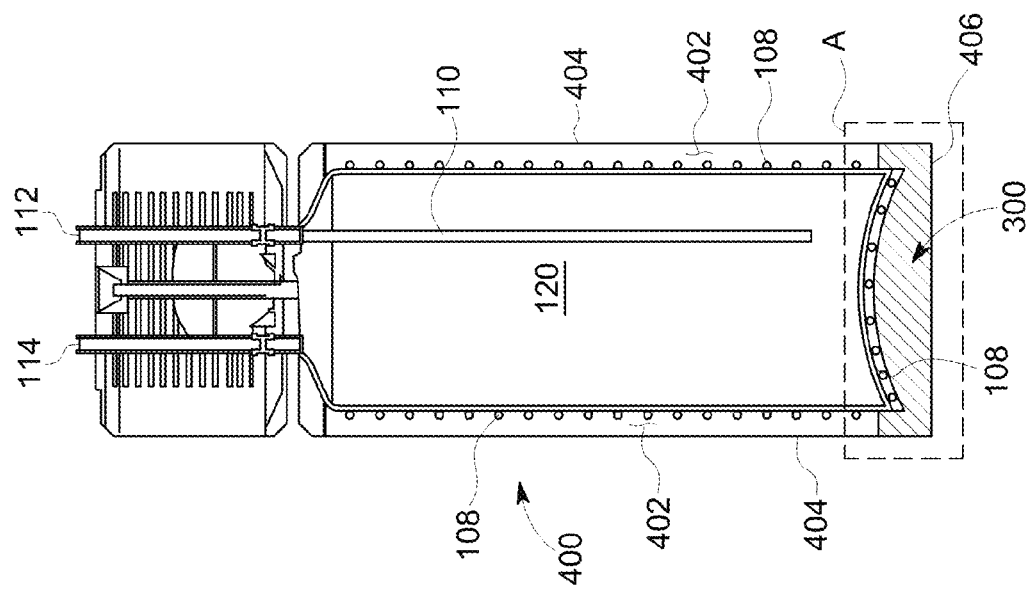
FIG. 4 is a diagram of a water heater assembly with the condenser coil holder of FIG. 3 installed therein, in accordance with an embodiment of the invention.
Figure 5:
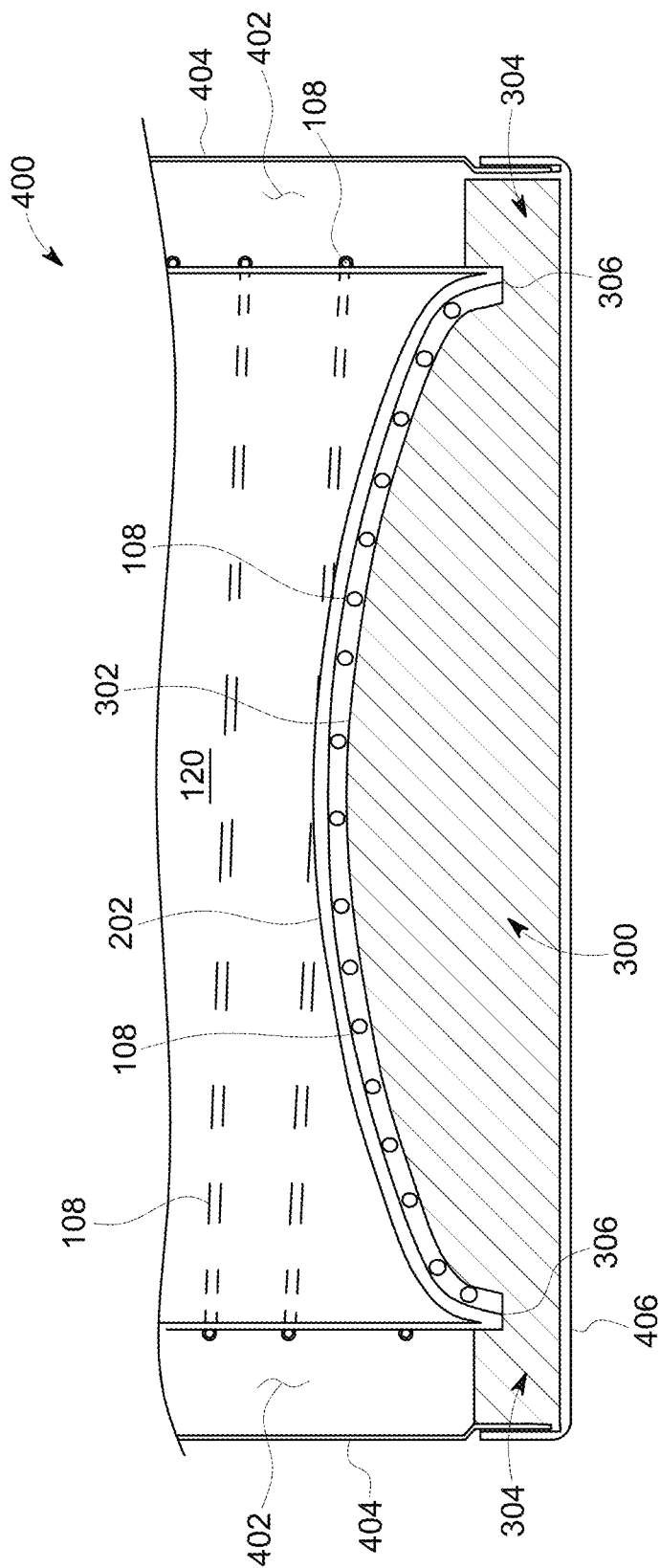
FIG. 5 is a diagram of an expanded view of section A of FIG. 4.

FIG. 4 is a diagram of a cutaway view of a water heater assembly with the condenser coil holder 300 of FIG. 3 installed therein, in accordance with an embodiment of the invention. Note that FIG. 5 is an expanded view of area A of FIG. 4.

As shown, the water heater assembly 400 includes the water storage tank 120, the water inlet line 112 and the dip tube 110, the water outlet line 114, and the condenser coil 108. Note that the water storage tank 120 is resting on the condenser coil holder 300 such that the convex center portion 302 of the holder 300 is pressing the condenser coil 108 firmly against the bottom of the water storage tank 120 thus holding the bottom portion of the condenser coil 108 against the bottom surface 202 of the water storage tank 120. As mentioned above, this improves energy transfer from the coil to the water in the tank. Also, to further improve the heat transfer relationship, thermal grease can be applied between the condenser coil and the tank bottom.

Note also that, during assembly, insulating foam 402 is applied around the outer side surface of the water storage tank 120, and then an outer water heater assembly side cover 404 is installed on top of the insulating foam 402. Also, the water heater assembly 400 also has a bottom cover 406 upon which the condenser coil holder 300 sits when installed.

Note further (as more easily seen in the expanded view afforded by FIG. 5) how the bottom of the water storage tank 120 sits in the channel portion 306 of the condenser coil holder 300 formed between the center portion 302 and the base portion 304. This serves to center the tank in the assembly 400. Also note that the center portion 302 expands to cover the area under the water storage tank 120, while the base portion 304 expands to cover out to the outer side cover 404 of the assembly 400. This serves to provide thermal insulation between the bottom 202 of the water storage tank 120 and the assembly bottom cover 406.

In another illustrative embodiment, a condenser coil holder is formed as a plastic injection molded part. Again, such a condenser coil holder can be formed as a single part via plastic being injected into a mold that conforms to the desired dimensions of the condenser coil holder. Alternatively, individual subparts of the condenser coil holder can be separately molded and then assembled to form the condenser coil holder. Again, those of ordinary skill in the art will readily appreciate how such a part and/or subparts can be formed.

The condenser coil holder also can be formed to have clearance for the coil tubing path molded in place. The holder can be made with minimal thickness and insulating properties. The process of filling the water heater assembly with insulating foam can also be used to fill the void under the holder and fully insulate the water heater bottom. This particular embodiment is shown in the context of FIGS. 6 and 7.

Figure 6:
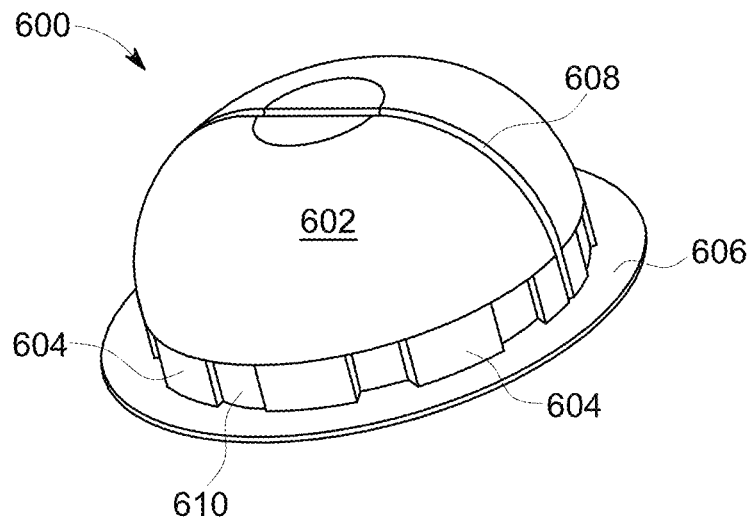
FIG. 6 is a diagram of a condenser coil holder, in accordance with another embodiment of the invention.

FIG. 6 is a diagram of a condenser coil holder 600, in accordance with another embodiment of the invention. The condenser coil holder 600 is preferably formed via a plastic injection molding process. The holder 600 has a convex center portion 602 with a plurality of legs 604 supporting the center portion 602 on a rim portion 606. The rim portion 606 serves as a base (as does the base portion 304 for the holder 300 in FIG. 3). In between the plurality of legs 604 are a plurality of openings 610. Note that before the holder 600 is installed in a water heater assembly, the interior of the convex center portion 602 is preferably opened and empty. These openings 610 are to allow for insulating foam to be injected under the holder 600 during assembly of the water heater system.

Also, formed through the center of the center portion 602 is a coil groove portion 608 running from one side of the rim portion 606 to the other side. In the illustrative embodiment shown in FIG. 6, the general convex shape of the center portion 602 is flattened on the top. Since the holder structure 600 of FIG. 6 is made of plastic, as opposed to polystyrene in the holder 300 of FIG. 3, and is therefore generally more rigid than the polystyrene embodiment, the flattened top is formed to accommodate the condenser coil 108 when it reaches the center of the bottom of the water storage tank 120 and bends upward to the bottom surface 202 (see FIG. 2). Note again that the condenser coil holder can be formed in alternative shapes depending on the shape of the tank bottom.

Figure 7:
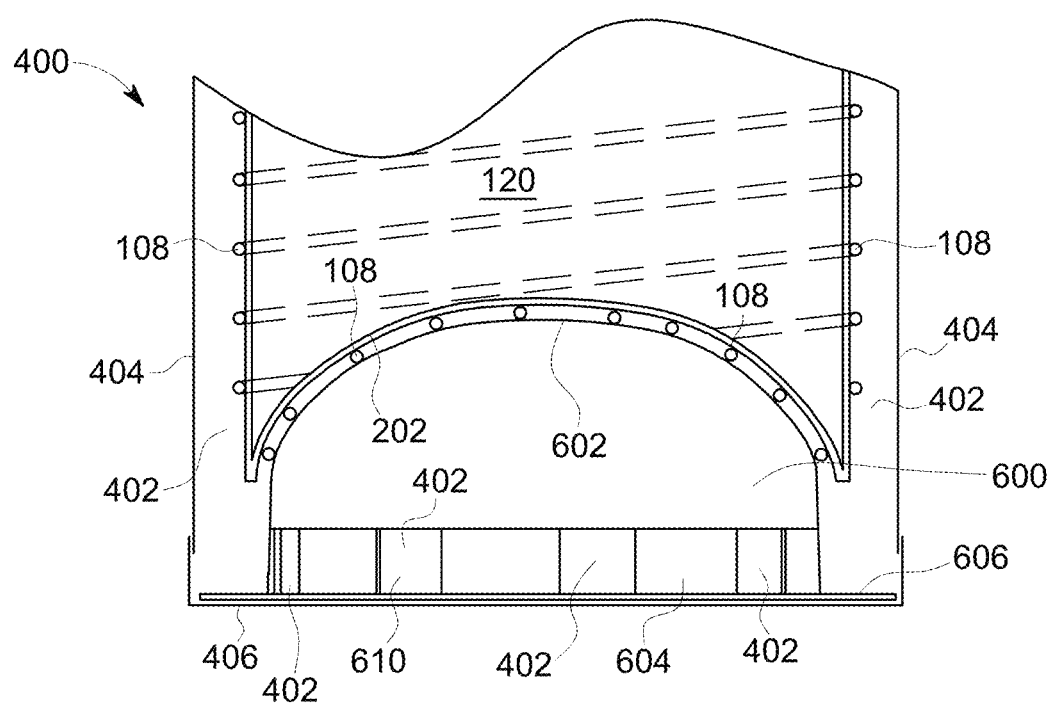
FIG. 7 is a diagram of the condenser coil holder of FIG. 6 installed in a water heater assembly, in accordance with an embodiment of the invention.

FIG. 7 is a diagram of the condenser coil holder 600 of FIG. 6 installed in the water heater assembly 400, in accordance with an embodiment of the invention. Note that the water storage tank 120 is resting on the condenser coil holder 600 such that the convex center portion 602 of the holder 600 is pressing the condenser coil 108 firmly against the bottom of the water storage tank 120 thus holding the bottom portion of the condenser coil 108 against the bottom surface 202 of the water storage tank 120. Again, this improves energy transfer from the condenser coil 108 to the water in the tank. Thermal grease can also be applied between the condenser coil and the tank bottom.

Note further how the bottom of the water storage tank 120 sits on top of the condenser coil holder 600. Depending on the shape of the holder 600 and/or the shape of the tank 120, the bottom edge of the tank perimeter can sit directly on the rim portion 606 of the holder 600 or it can be slightly above the rim portion 606 (as shown in illustrative configuration of FIG. 6). Again, this serves to center the tank in the assembly 400.

Recall the plurality of openings 610 formed between the plurality of legs 604 in the holder 600. During assembly of the water heater 400, when insulating foam 402 is injected on the sides of the heater (between tank 120 and outer side cover 404), insulating foam 402 is also injected through one or more of the openings 604 to fill the empty area under the center portion 602 and around the legs 604 down to the rim portion 606. This serves to provide thermal insulation between the bottom 202 of the water storage tank 120 and the assembly bottom cover 406. Note that if the water heater tank is shaped so that it sits down directly on the rim portion 606 of the holder 600 (thus blocking the openings 604), then insulating foam could be added to the void under the holder 600 before assembly.

Thus, while there have been shown and described and pointed out fundamental novel features of the invention as applied to exemplary embodiments thereof, it will be understood that various omissions and substitutions and changes in the form and details of the devices illustrated, and in their operation, may be made by those skilled in the art without departing from the spirit of the invention. Moreover, it is expressly intended that all combinations of those elements and/or method steps which perform substantially the same function in substantially the same way to achieve the same results are within the scope of the invention. Furthermore, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A water heater assembly comprising:
   a water storage tank;
   a condenser coil routed under the water storage tank; and
   a condenser coil holder comprising a first portion formed to have a shape that is substantially complementary to a shape of a bottom surface of the water storage tank so as to hold the condenser coil against the bottom surface of the water storage tank, a second portion formed as a base for the first portion, a channel portion formed between the first portion and the second portion, and at least one condenser coil-accommodating groove open to the bottom surface of the water storage tank and extending outward from a center of a top of the first portion, traversing the channel portion and ending at least partially through the second portion to direct at least one part of the condenser coil below another part of the condenser coil,
   wherein the shape of the bottom surface of the water storage tank is concave and the shape of the condenser coil holder is convex, and wherein the condenser coil extends to the center of the top of the first portion and spirals outward to the outer perimeter of the tank bottom.

2. The water heater assembly of claim 1, wherein the channel portion is configured to accommodate an outer bottom perimeter of the water storage tank.

3. The water heater assembly of claim 2, wherein the condenser coil holder further comprises a support portion formed between the first portion and the second portion.

4. The water heater assembly of claim 3, wherein the condenser coil holder further comprises one or more openings in the support portion.

5. The water heater assembly of claim 1, wherein the condenser coil holder is formed from a foam material.

6. The water heater assembly of claim 5, wherein the foam material comprises polystyrene.

7. The water heater assembly of claim 1, wherein the condenser coil holder is formed from a plastic material.

8. The water heater assembly of claim 7, further comprising insulating foam injected in an area under the condenser coil holder.

9. A water heater assembly comprising:
   a water storage tank including a bottom surface defining an outer bottom perimeter;
   a condenser coil routed beneath the bottom surface of the water tank; and
   a condenser coil holder comprising a first portion having a shape complementary to the bottom surface of the water storage tank so as to hold the condenser coil against the bottom surface of the water storage tank, a second portion formed as a base for the first portion, a channel portion defined between the first portion and the second portion, and at least one condenser coil-accommodating groove along the bottom surface of the water storage tank and extending radially outward from a center of a top of the first portion, traversing the channel portion and ending at least partially through the second portion to direct at least one part of the condenser coil below another part of the condenser coil,
   wherein the channel portion is configured to accommodate the outer bottom perimeter of the water storage tank, and wherein the condenser coil extends to the center of the top of the first portion and spirals outward to the outer perimeter of the tank bottom.

10. The water heater assembly of claim 9, wherein the condenser coil holder further comprises a support portion formed between the first portion and the second portion.

11. The water heater assembly of claim 10, wherein the condenser coil holder further comprises one or more openings in the support portion.

12. The water heater assembly of claim 9, wherein the condenser coil holder is formed from a foam material.

13. The water heater assembly of claim 12, wherein the foam material comprises polystyrene.

14. The water heater assembly of claim 9, wherein the condenser coil holder is formed from a plastic material.

15. The water heater assembly of claim 14, further comprising insulating foam injected in an area under the condenser coil holder.

* * * * *